ized Apr. 29, 1969

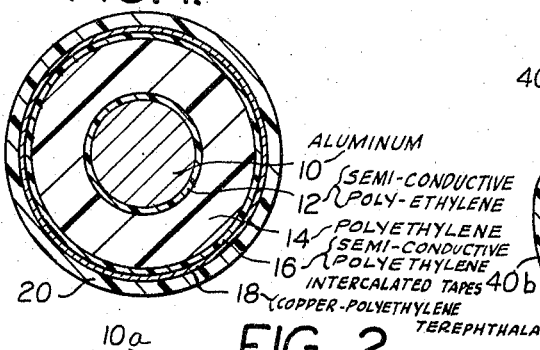
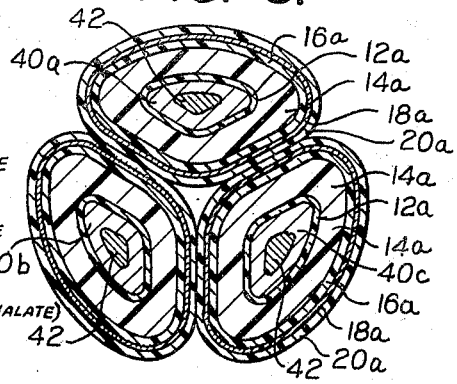
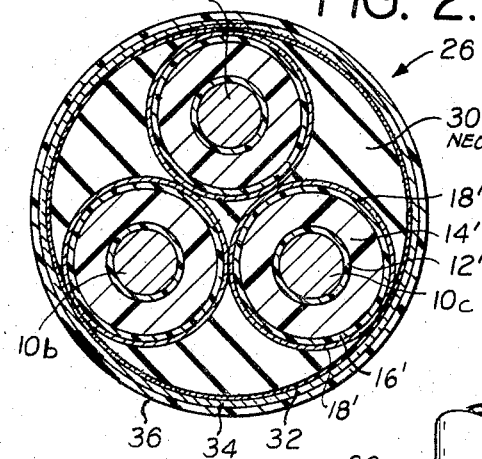
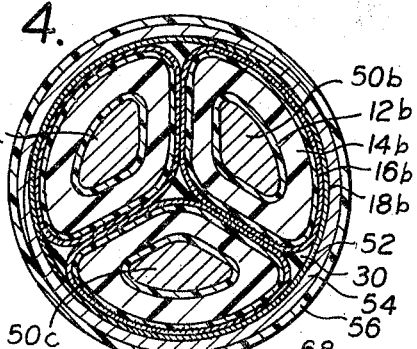
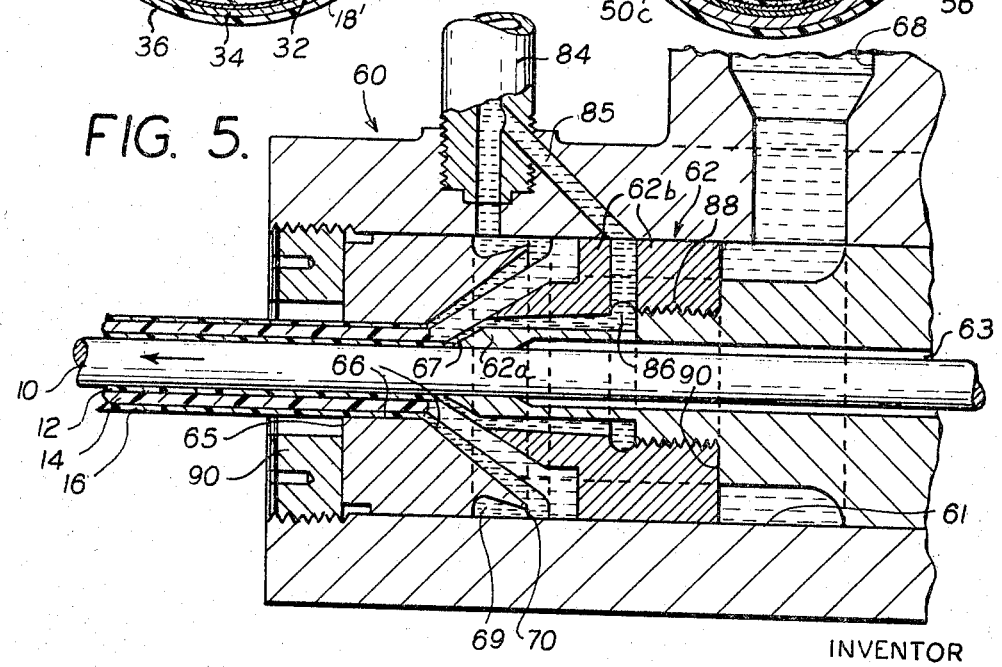

United States Patent Office 3,441,660
Patented Apr. 29, 1969

3,441,660
SOLID ALUMINUM CONDUCTOR INSULATED
WITH CROSS-LINKED POLYETHYLENE
Oscar G. Garner, Westfield, N.J., assignor to General
Cable Corporation, New York, N.Y., a corporation of
New Jersey
Filed July 12, 1966, Ser. No. 564,658
Int. Cl. H01b 7/18
U.S. Cl. 174—102                                 8 Claims

ABSTRACT OF THE DISCLOSURE

A lightweight power cable is made with solid aluminum conductors having semiconducting layers bonded both to the inside and outside of an insulating layer. The inner semiconducting layer is preferably bonded to the conductor. These bonded layers adhere tightly to each other so that there are no voids formed between layers when the conductors are twisted in the original cabling operation, and the insulating layer of cross-linked polyethylene is not permanently degraded in electric strength by the twisting as would be expected. The cables can, therefore, be manufactured with solid conductors and without "preforming" the solid conductors to give them a twist in the direction of their lay in the finished cable. To impart added tensile strength to the solid aluminum conductors one embodiment of the invention has a steel core embedded in each of the aluminum conductors.

Brief description of the invention

This invention relates to cables and more especially to power cables that have semi-conducting layers inside and outside of the electrical insulation.

It is an object of the invention to provide an improved power cable with inner and outer layers fused to an intermediate insulating layer. These inner and outer layers are much thinner than the insulating layer and they are made of plastic compounded so as to make it a semi-conductor of electricity.

Another object is to provide a lightweight power cable having one or more solid aluminum conductors each of which is surrounded by an extruded conductor shield, electrical insulation, and an insulation shield. In the preferred embodiment of the invention these three extrusions are bonded together as a result of having been applied substantially simultaneously.

Another object is to provide a method of applying electrical insulation and semi-conducting layers inside and outside of the electrical insulation in one operation. This is accomplished by extruding the three layers from a single extruder, and the layers are fused together as a result of this method of application. The invention provides an inexpensive process for obtaining successive layers on a power cable without voids between the layers, and the fusion of the separate layers to one another maintains intimate contact when the conductors are subsequently cabled or bent around various radii.

The invention can be used with single conductors or multiple conductor cables having the conductors either round or sector-shaped.

Other objects, features and advantages of the invention will appear or be pointed out as the description proceeds.

Brief description of drawing

In the drawings, forming a part hereof, in which like reference characters indicate corresponding parts in all the views:

FIGURE 1 is a cross section of a single conductor made in accordance with this invention;

FIGURE 2 is a cross section of a multiple conductor cable made in accordance with this invention;

FIGURE 3 is a cross section of a multiple conductor cable having sector-shaped conductors;

FIGURE 4 is a view similar to FIGURE 3 but showing the cable with fillers and a metalized binder around the circumference of the group of sector-shaped conductors, and also with an aluminum sheathing and a protecting plastic jacket;

FIGURE 5 is a diagrammatic vertical, sectional view through an extrusion die which applies three layers of material to the conductor in one operation, and this view illustrates one method of making improved power cables in accordance with this invention.

Description of preferred embodiments

FIGURE 1 shows a solid aluminum conductor 10 with a semiconducting layer 12 surrounding the conductor 10. Outside of the semiconducting layer 12 there is a layer of electrical insulation 14, and this electrical insulation is surrounded by an outer semiconducting layer 16.

The three layers 12, 14 and 16 are made of thermoplastic materials and are extruded, preferably in one operation and then cross-linked or vulcanized, as will be described more fully in connection with FIGURE 5. The layers 12, 14 and 16 are thereby bonded to one another and the layer 12 is bonded to the conductor 10. The semiconducting layers 12 and 16 are preferably cross-linked polyethylene with carbon added, or otherwise compounded so as to make the material a semiconductor of electricity.

The electrical insulation 14 is preferably cross-linked polyethylene. Other insulating materials having similar characteristics, and which can be extruded, are suitable; but polyethylene has the advantage of being extremely light in weight and this, combined with the aluminum conductor, is especially advantageous.

One of the outstanding advantages of this invention over conventional constructions is that since the conductor is solid and the insulation has its two shields extruded with it as one "homogeneous mass" and tightly over the conductor, the construction does not "wick" and permit moisture to migrate along the conductor or along the interfaces between the insulation and the shields. This is particularly important in underground cables.

In cables constructed in accordance with this invention, it is impossible for voids to develop in service between the insulation 14 and the inner and outer shields 12 and 16. This commonly occurs in service in cables with conventional shields. The daily load cycling of the cable expands and contracts the insulation and it slowly works itself loose from the shields, particularly the insulation shield as cables are now made because this latter shield does not adhere to the insulation.

The shield layers 12 and 16 are much thinner than the insulation 14. It is advantageous to have each of these shielding layers 12 and 16 between 2 and 5 mils in radial thickness, though thicknesses up to 50 mils can be used. These figures are given by way of illustration and in connection with conductors 10 having a diameter of 0.5" and with an insulating layer 14 having a radial thickness of 0.2". Because of the fusion adhesion of the layers 12 and 16 to the insulation 14, it is more difficult to remove these shielding layers from the insulation when terminating or splicing the conductor. Making the shielding layers thinner facilitates removal, when necessary.

Intercalated copper plastic tapes 18 are wrapped around the outside of the outer shielding layer 16. The plastic used for the tape 18 is preferably polyethylene terephthalate which is available commercially under the trade name Mylar. A polyvinyl chloride jacket 20 covers the tapes 18. Other plastic material can be used for the jacket 20, but polyvinyl chloride is preferred because it is inexpensive and tough.

FIGURE 2 shows a cable 26 which is made up of three conductors 10a, 10b and 10c. Each of these conductors has an inner shielding layer, an insulating layer, and an outer shielding layer, corresponding to the layers 10, 14 and 16 of FIGURE 1 and indicated by the same reference character with a prime appended. Each of the conductors 10a, 10b and 10c has its outer shielding layer 16′ surrounded by intercalated copper-Mylar tapes, or equivalent shielding, indicated by the reference character 18′, and the space between the insulated conductors and around the outsides of them are filled with filler material 30, preferably neoprene.

The conductors 10a, 10b and 10c are preferably aluminum, though it will be understood that most of the features of this invention can be obtained if other material, such as copper, is used for the conductors. However, the light weight which results from the combining of aluminum conductors and polyethylene insulation is characteristic of the preferred embodiment and cannot be obtained if heavier conductors are substituted.

The insulated conductors 10a, 10b and 10c are twisted in accordance with conventional cabling practice and with the neoprene filler 30, the assembly has a circular cross section. A metalized Mylar binder 32 is wrapped around the circumference of this assembly and in the construction shown in FIGURE 2 there is a corrugated continuous weld aluminum sheath 34 covered with a jacket 36 which may be polyethylene or polyvinyl chloride or any other conventional jacket material used for electrical cables.

FIGURE 3 shows a construction in which conductors 40a, 40b and 40c are sector-shaped. These conductors are preferably made of aluminum and in order to increase the tensile strength of the cable, each of the conductors 40a, 40b and 40c has a steel core 42. Such a steel core can be used with the conductors shown in the other figures of the drawing if the requirement for higher tensile strength is such as to justify an increase in the weight of the cable.

Each of the conductors 40a, 40b and 40c has an inner shielding layer 12a, an insulation layer 14a, an outer shielding layer 16a, intercalated copper and Mylar tapes 18a and jacket 20a, corresponding to the layers already described in connection with the conductors shown in FIGURES 1 and 2. The insulated and shielded conductors of FIGURE 3 are twisted together and they require no outside jackets other than those on the individual insulated conductors. This construction has the advantage of producing a more compact cable than is obtained with the construction of FIGURE 2.

The insulated conductors 40a, 40b and 40c are twisted, in accordance with conventional cabling practice. Prior to the construction of the multiple conductor cable shown in FIGURE 3, it was expected that the aluminum conductors 40a, 40b and 40c would have to be "preformed" so as to have a twist in one direction, the lay-length of the twist being the same as the cabling lay of the three insulated conductors twisted together. However, during the manufacture of these cables, totally unexpected results were obtained. It was discovered that the preforming was not necessary and that it is possible to cable the insulated and shielded sector-shaped conductors 40a, 40b and 40c together on conventional cabling equipment, imparting a permanent twist to the three conductors without impairing the electrical strength of the insulation 14a. It was fully expected that the cross-linked polyethylene insulation would be permanently degraded in electric strength by this twisting, because of the induced stresses placed in it, but this proved not to be the case.

FIGURE 4 shows a construction which is similar to FIGURE 3 except that the individual conductors, designated in FIGURE 4 by the reference characters 50a, 50b and 50c, each has an inner semiconducting layer 12b, an insulating layer 14b, an outer shielding layer 16b and the intercalated copper-metalized Mylar tapes 18b, but no jacket around each individual conductor outside of the tapes 18b. A limited amount of usual filler 30 is used to round out the contour of the assembly to a circular cross section and a metalized Mylar binder 52 is applied over the circumference of the assembly, including the neoprene filler 30. FIGURE 4 shows an outer corrugated continuous weld aluminum sheet 54 covered with a jacket 56 of polyethylene, polyvinyl chloride, or other suitable jacket material.

FIGURE 5 shows apparatus for applying the layers 12, 14 and 16 to the conductor 10 of FIGURE 1, or the corresponding layers to the conductors 10a, 10b and 10c of FIGURE 2. It will be understood that similar apparatus, with a change in nozzle shape, is used for applying the layers 12a, 14a and 16a to the conductors of FIGURE 3, and the corresponding layers to the conductors of FIGURE 4.

In FIGURE 5, an extrusion head 60 continuously extrudes a laminar wall of plastic compounded in distinct interbonded layers onto the moving conductor 10. These interbonded layers are the layers 12, 14 and 16 surrounding the conductor. A composite extrusion tip 62 is supported in a conventional extruding machine die body chamber, designated generally by the reference character 61. The extrusion tip 62 is provided with a longitudinal aperture 63 through which the conductor 10 moves from right to left. Supported in the die body chamber 61, spaced beyond the extrusion tip 62, is an extrusion die 65, having a throat 66 which fixes the final overall diameter of the interbonded layers.

The tip 62 is made in two parts which include an inner part 62a and an outer part 62b. An annular outlet 67 is provided between the parts 62a and 62b at the discharge end of the tip 62 (the left-hand end in FIGURE 5) and semiconducting plastic material forms the inner layer 12 is extruded from this outlet 67 onto the entire circumference of the conductor 10. The feeding of this semiconducting plastic to the annular outlet 67 and the connection of the parts 62a and 62b to one another will be described in connection with the supply of semiconducting plastic for the outer layer 16 which comes from the same source.

Entry of the plastic insulating material for the intermediate layer 14 is made through an opening 68; and the plastic insulating material is forced into the die body chamber 61 by the usual screw feeding means, not shown. The plastic insulating material is forced through the relatively constricted passageway between the composite tip 62 and the throat 66, but semiconducting plastic material from the outlet 67 is bled in under the insulation material at the same time that the insulation material is extended.

Reference herein to bleeding this plastic material into the interface between the body of insulation material and the conductor are to be construed as meaning continuously exuding under pressure a comparatively small metered amount of the semiconducting plastic material between the circumference of the conductor 10 and the layer of insulation 12.

The outer layer 16 of semiconducting material is bled to the outside surface of the insulating material but at a location near the outer limits of the tapered surface of the portion of the extrusion die 65 that forms the throat 66.

By controlling the pressure of the plastic material within the peripheral channel 69, the amount of plastic material which bleeds over the edge 70 of the die to the interface between the wall-forming surface of the die and the thicker body of plastic compound, which forms the insulating layer 14, can be closely controlled. Semi-conducting plastic material is supplied to the channel 69 through the wall of the die body chamber 61, under pressure, by conventional screw or equivalent means not shown.

The space (shown exaggerated in the drawing) between the leading edge 70 of the die 65 and the wall of the die body chamber 61 is narrow and controls the thickness of the plastic compound bled from the channel 69 to the interface between the insulating body and the wall-forming surface of the extrusion die. By selection of suitable pressures of the plastic materials, it is possible to form, on the outer surface of the underlying plastic insulating layer 14, a thin layer 16 which in the final product may be a mil or even less, or a few mils in thickness. This thin skin of semiconducting plastic material so formed is intimately and uniformly bonded to the underlying insulating plastic wall through fusion of the two plastic materials resulting from exposure to the pressure and temperature within the extruding head. The layer of plastic material being bled to the outer surface of the thicker plastic insulating layer in limited amount spreads uniformly and acts somewhat as a lubricant between the funnel-shaped, wall-forming surface of the extrusion die 65 and the outer surface of the plastic insulating layer 14 moving through the apparatus.

Plastic material for the outer semiconducting layer 16, as well as for the inner layer 12, is supplied from a pipe 84 to the channel 69 and also through a passage 85 into an annular chamber 86 that supplies the plastic material for the outlet 67 already described.

Additional means are provided for controlling the thickness of the semiconducting layers 12 and 16 with respect to the insulation layer 14, and with respect to one another. One of these means is the connection by the threads 83 between the inner part 62a and the outer part 62b of the extrusion tip 62. These threads 88 permit axial adjustment of the position of the outer part 62b die with respect to the inner part 62a. Adjustment of the part 62b toward the right in FIGURE 5 reduces the thickness of the layer 12, if other conditions remain the same. FIGURE 5 shows the part 62b at the right hand limit of its travel in contact with a shoulder 90.

The die 65 is held in place by a collar 90 that threads into the left hand end of the body chamber 61; and the position of the die 65 can be changed by rotating the collar 90 one way or the other in these threads. Screwing the collar 90 toward the right in FIGURE 5 reduces the thickness of the outer layer 16 and screwing the collar 90 toward the left increases the thickness of this layer 16. In the preferred construction both layers 12 and 16 are of substantially equal radial thickness.

The preferred embodiments of the invention have been illustrated and described, but changes and modifications can be made, and some features can be used in different combinations without departing from the invention as defined in the claims.

What is claimed is:

1. A power cable comprising a plurality of conductors each of which is of segmental cross section and shaped to make the cross section of the cable generally circular, cross-linked polyethylene insulation on each of the conductors, the insulated conductors being cabled together with a degree of twist of the individual insulated conductors, each conductor having a semiconducting layer of material on the conductor, and having the electrical insulation for the conductor outside of said semiconducting layer, and an outer semiconducting layer extending completely around each of the individual insulated conductors, said outer layer, insulation, and inner layer being fused together to form one homogeneous mass to prevent formation of voids between the insulation and either of the semiconducting layers, the semiconducting layers being of much less thickness than the insulation, each semiconducting layer having a thickness between 2 and 50 mils and said insulation having a thickness between 150 and 1000 mils, and other layers surrounding said group of conductors and giving the cable a substantially circular cross section.

2. The power cable described in claim 1 characterized by the conductors being made mostly of aluminum, and a steel reinforcing wire imparting added tensile strength to the cable.

3. The power cable described in claim 1 characterized by each of the conductors being aluminum with a steel wire imbedded therein for imparting higher tensile strength to the cable.

4. The power cable described in claim 1 characterized by the layers that are fused to the inside and outside faces of the insulation being semiconducting polyethylene, copper-metalized polyethylene terephthalate tapes intercalated around each of the insulated conductors, and an outer polyvinyl chloride jacket around each of the cabled conductors.

5. The power cable described in claim 1 characterized by the layers fused to the inside and outside faces of the insulation being semiconducting polyethylene, copper-metalized polyethylene terephthalate tapes intercalated around each of the conductors, an outer metalized polyethylene terephthalate binder around the group of conductors, a corrugated metal sheath around said binder, and an outer polyvinyl chloride jacket surrounding the corrugated metal sheath.

6. The power cable described in claim 5 characterized by the electrical insulation and its fused semiconducting layers around each conductor being distorted to the extent to which its conductor is twisted in the cabling of said conductors, and resilient filler material in the voids between the insulated conductors.

7. The power cable described in claim 1 characterized by the inner layer of semiconducting material being bonded to the circumference of each of said solid cores, the solid conductors with the semiconducting and insulating layers being twisted together in a helical lay in said power cable with the insulation under the stress imparted to it by the twisting of the conductors to the helical lay.

8. The power cable described in claim 7 characterized by the core being a solid aluminum conductor, and all of said layers being cross-linked polyethylene, the semiconducting layers having a thickness between 2 and 50 mils, and preferably between 2 and 5 mils, and the electrical insulation having a thickness between 150 and 1000 mils, metalized tape wrapped over the outer semiconducting layer, and a polyvinyl chloride jacket over the metalized tape and constituting the outer layer of said power cable conductor, the electrical insulation having its electrical strength unimpaired by the twisting together of the insulated conductors.

References Cited

UNITED STATES PATENTS

| | | | |
|---|---|---|---|
| 2,147,095 | 2/1939 | Hochstadter | 174—103 |
| 2,304,210 | 12/1942 | Scott et al. | 174—110 |
| 2,315,039 | 3/1943 | Beede | 174—102 |
| 2,377,153 | 5/1945 | Hunter et al. | 174—107 X |
| 2,446,387 | 8/1948 | Peterson | 174—102 X |
| 3,236,939 | 2/1966 | Blewis et al. | 174—110 |
| 3,206,541 | 9/1965 | Jachimowicz | 174—105 |
| 3,222,149 | 12/1965 | Drummond. | |
| 3,259,688 | 7/1966 | Towne et al. | 174—102 X |
| 3,248,473 | 4/1966 | Buhmann | 174—107 X |
| 3,325,325 | 6/1967 | Ward | 174—110 X |
| 3,187,071 | 6/1965 | Radziejowski | 264—174 |

OTHER REFERENCES

The Aluminum Association: Code Words for Aluminum Electrical Conductors, pp. 4–5.

LEWIS H. MYERS, *Primary Examiner.*

A. T. GRIMLEY, *Assistant Examiner.*

U.S. Cl. X.R.

174—110, 116, 126, 127

U.S. DEPARTMENT OF COMMERCE

PATENT OFFICE

Washington, D.C. 20231

UNITED STATES PATENT OFFICE
CERTIFICATE OF CORRECTION

Patent No. 3,441,660

April 29, 1969

Oscar G. Garner

It is certified that error appears in the above identified patent and that said Letters Patent are hereby corrected as shown below:

Column 4, line 7, "sheet" should read -- sheath --.

Signed and sealed this 14th day of April 1970.

(SEAL)
Attest:

Edward M. Fletcher, Jr.
Attesting Officer

WILLIAM E. SCHUYLER, JR.
Commissioner of Patents